Patented Nov. 10, 1936

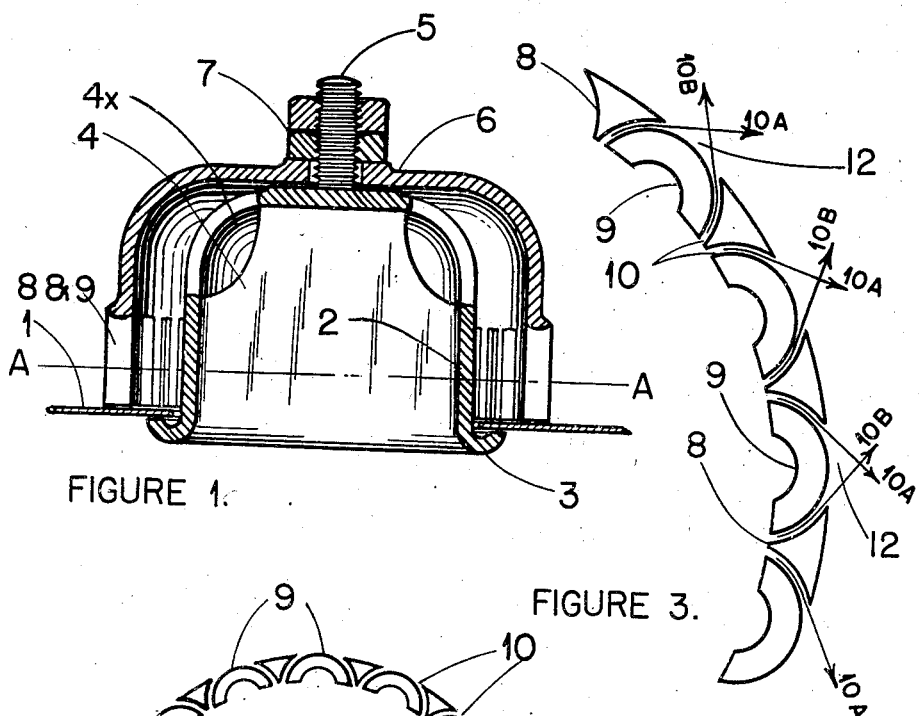

2,060,601

UNITED STATES PATENT OFFICE 2,060,601

BUBBLE CAP

Theodore O. Wentworth, Cincinnati, Ohio

Refiled for abandoned application Serial No. 711,892, February 19, 1934. This application November 8, 1935, Serial No. 48,863

2 Claims. (Cl. 261—114)

This invention relates to improvements in bubble caps for effecting contact and heat transfer between vapors and liquids. In the art of distillation and rectification, it is particularly important to secure a means and apparatus for intimately mixing or contacting vapors of the liquid or liquids being distilled with a wash liquid. This usual equipment takes the form of a rectifying column; and it is with the bubbling caps used in such a column for such contacting of liquid and vapor that my present invention deals.

One object of my invention is the securing of a means for the efficient mixing of a vapor or gas with a liquid on the trays or plates of a distilling column. A second object is the reduction of the total number of trays or plates required for said distilling column in the separation of volatile liquids by rectification. Still another object is the mixing of vapors with a liquid by the action of suitably directed streams of said vapors impinging on each other in the body of said liquid. Still other objects and effects will hereinafter appear.

The invention will be described with reference to the accompanying drawing, in which:—

Fig. 1 is a diagrammatic vertical sectional view of a preferred form of my bubble cap showing one method of attaching it to the plate.

Fig. 2 is a horizontal cross-section on the line A—A, Fig. 1, showing the two shapes of teeth utilized to secure the desired effects.

Fig. 3 is an enlarged cross section of a small sector for the cap illustrating the action of the vapors in the liquid.

Fig. 4 illustrates a diagrammatic cross-section of a section of a rectifying column showing the relation of the caps to the structure of a rectifying column as a whole.

In the drawing, like parts are referred to by like symbols, and in Fig. 1, 1 is a section of the plate or tray of a distilling column, and 2 is the thimble having a general cylindrical shape of smaller diameter than the hole in the plate, and being formed with a flange 3 to fit against the lower surface of the plate. Passageways 4x, one at each side of the spider-arch 4, allow vapors to pass through the top of the thimble while the arch supports a threaded stem 5 which passes through the hole in the top of the cap 6. Lock nuts 7 threaded on the stem are employed to secure the cap to the thimble and thus to the plate. The teeth 8 and 9 of special shape have slots between them through which vapors issue.

In Fig. 2, the combination of teeth 8 of a general triangular shape, and teeth 9 of a general semicircular shape are illustrated to provide slots 10 between them for the passage of vapors.

Fig. 3 shows that the jets of vapor 10a and 10b issuing through the slots 10 assume the form of streams having a general direction roughly tangential to the periphery of the cap itself. Since these streams are opposed in direction, they meet at a vertical line of the same height as the depth of the slots.

Fig. 4 illustrates the general arrangement of a plurality of such caps 6 on plates 1 of a rectifying column in conjunction with a shell 20, and vertical flow pipes or "downcomers" 30 for the passage of a wash liquid from higher to lower plates.

The art of rectification depends on contacting vapors with liquids and is usually practiced in vertical columns of one of three general types; (a) packed; (b) curtain; (c) bubble cap. The contacting action in (a) is due to the trickling of liquid in thin streams down the surfaces of filling bodies, around and through which vapor streams rise.

In the curtain type column, exemplified by patent to Schneible, No. 1,794,986, and German patent to Komorek, No. 497,905, the streams of liquid are allowed to fall in thin films or curtains from plate to plate; and the vapors are passed at right angles through these curtains in their travel to the top of the column.

For various reasons, the column most often used is the bubble cap type in which bubbles of vapor are compelled to travel through layers of liquid spaced above each other. The energy required for the agitation of vapor and liquid on each plate or tray is supplied by the successive expansion of the vapors from a pressure accumulated in the still pot to the lower pressure existing in the condenser. While advantage has been taken of this pressure to secure intimate mixing in various types of bubble caps, such as the ejector nozzle of U. S. Patent No. 1,741,519, and the "air lift" principle of U. S. Patent No. 1,821,619, as well as the more common slotted or serrated edge, vertically or horizontally placed, in common use, I have found that the opposed tangential jet action which I employ gives a more efficient mixing with a more simply constructed cap than any of these.

Moreover, a principal cause for the very high efficiency of my bubble cap resides in the fact that the two streams of vapor, by impinging at an angle a short distance from the periphery of the cap, violently mix the entrained liquid and other surrounding liquid to form the vortex of a miniature "waterspout", which contacts the liquid and the vapor so efficiently that the particles of each are very minute, and a substantial equilibrium is more nearly approached.

This action has been carefully observed, and the unusual shape of the teeth precisely determined for maximum efficiency by enclosing plates of a distilling column within a glass shell such as 20 and examining the action produced on the plates by caps in which the slots were slightly different in size and arrangement.

I have found that the use of my bubble cap gives a comparable increase of efficiency in those operations related to rectification such as, for example, the washing or scrubbing of gases by a liquid flowing in counter-current to the gas stream, or the accomplishing of a chemical reaction in the liquid or gaseous phase, when the reaction is aided by the presence of two such phases.

My bubble cap has the additional advantage that it may be readily manufactured in large quantities of any material which may be resistant to corrosion in the particular liquids and vapors encountered. It may be readily produced by casting in one piece as shown and it requires no machining, punching, or drilling as is common in the quantity production of older forms of bubble caps.

This application is a substitute for abandoned application No. 711,892, filed February 19, 1934.

Having described my invention, what I claim and desire to secure by Letters Patent, is as follows:

1. In apparatus of the character described, a bubble cap internally formed to receive vapor and provided with a plurality of peripheral teeth, successive teeth in cross-section being substantially triangular and substantially semi-annular.

2. In apparatus of the character described, a bubble cap internally formed to receive vapor and provided with peripheral teeth, alternate teeth being substantially triangular with the apex of the triangle directed toward the axis of the cap and intermediate teeth each having surface areas contiguous to walls of two of said triangular teeth and in conformity therewith whereby the opposed separated walls of the two sets of teeth form angular vapor stream guides.

THEODORE O. WENTWORTH.